US008042824B2

(12) United States Patent
Borisoff

(10) Patent No.: US 8,042,824 B2
(45) Date of Patent: Oct. 25, 2011

(54) WHEEL MOUNT ASSEMBLY

(76) Inventor: Jaimie Borisoff, Vancouver (CA)

( * ) Notice: Subject to any disclaimer, the term of this patent is extended or adjusted under 35 U.S.C. 154(b) by 288 days.

(21) Appl. No.: 11/998,659

(22) Filed: Nov. 29, 2007

(65) Prior Publication Data

US 2008/0143172 A1 Jun. 19, 2008

Related U.S. Application Data

(60) Provisional application No. 60/867,587, filed on Nov. 29, 2006.

(51) Int. Cl.
*A61G 5/10* (2006.01)
*B62D 1/14* (2006.01)

(52) U.S. Cl. .................................. 280/304.1; 280/250.1

(58) Field of Classification Search ............... 280/250.1, 280/304.1
See application file for complete search history.

(56) References Cited

U.S. PATENT DOCUMENTS 4,489,955 A * 12/1984 Hamilton ................... 280/250.1
4,592,570 A * 6/1986 Nassiri .......................... 280/650
4,768,797 A * 9/1988 Friedrich ................... 280/250.1
4,852,899 A * 8/1989 Kueschall .................. 280/250.1
5,060,962 A 10/1991 McWethy
5,259,635 A 11/1993 Picker
5,361,494 A * 11/1994 Robertson et al. ........... 29/897.2
5,409,247 A * 4/1995 Robertson et al. ......... 280/250.1
5,480,172 A * 1/1996 James ........................ 280/250.1
5,851,018 A 12/1998 Curran et al.
6,168,177 B1 1/2001 Schillo et al.
6,182,992 B1 2/2001 Garven, Jr.
6,247,717 B1 * 6/2001 Lovins et al. .............. 280/250.1
6,302,429 B1 * 10/2001 Friedrich ...................... 280/649
6,974,194 B2 12/2005 Schreiber et al.
7,249,773 B2 7/2007 Schreiber et al.
2001/0011805 A1 * 8/2001 Kueschall .................. 280/250.1
2002/0145271 A1 * 10/2002 Sanchez ........................ 280/658
2003/0034635 A1 2/2003 Ludovici
2005/0055995 A1 * 3/2005 Kappel et al. ................... 56/375
2006/0049593 A1 3/2006 Schreiber et al.
2006/0049608 A1 3/2006 Schreiber
2006/0055143 A1 3/2006 Schreiber et al.
2006/0066143 A1 * 3/2006 Cerreto ...................... 297/301.1
2006/0087103 A1 4/2006 Schreiber et al.
2007/0246907 A1 10/2007 Huber et al.

FOREIGN PATENT DOCUMENTS

DE 3517050 A1 * 11/1986
DE 29605439 U1 * 6/1996

* cited by examiner

*Primary Examiner* — Anne Marie Boehler
*Assistant Examiner* — Daniel Yeagley
(74) *Attorney, Agent, or Firm* — Ryan W. Dupuis; Kyle R. Satterthwaite; Ade & Company Inc.

(57) ABSTRACT

A wheel mount assembly for mounting a drive wheel to a frame of a wheelchair is provided. The assembly includes a camber body attachable to an axle of one of the drive wheels and operable to pivotably couple about the frame through a range of camber angles; a spacer operable to set a desired camber angle, the spacer contacting the camber body at the desired camber angle; and a clamp operable to secure the camber body and the spacer to the frame at the camber angle. Optionally, a transverse member, extending between the drive wheels, may engage a portion of the frame such that the clamp is prevented from pivoting through the camber angles of each respective camber body. Again, optionally, the wheel mount assembly may be clamped to the frame at a multitude of positions, thus facilitating adjustment of the center of gravity of the wheelchair.

16 Claims, 6 Drawing Sheets

WHEEL MOUNT ASSEMBLY

CROSS REFERENCE TO RELATED APPLICATION

The present application claims the benefit of U.S. Provisional Patent Application No. 60/867,587, filed Nov. 29, 2006, which is incorporated herein by reference.

FIELD

This invention relates in general to improvements in wheel mount assemblies of the type used with wheelchairs and other devices. More particularly, this invention relates to an improved wheel mount assembly that provides center of gravity adjustability and wheel camber angle adjustability.

BACKGROUND

Wheel mount assemblies in general are well known in the art for use with many different types of wheeled devices. Such wheel mount assemblies are commonly employed for mounting the rear wheels on a typical wheelchair. Each wheel mount assembly typically incorporates a number of adjustments that allow the wheelchair occupant to customize the wheelchair to his or her body proportions, body mechanics, and driving conditions. Frequently, the rear wheels of the wheelchair are cambered, or angled with respect to a vertical plane. A wheelchair with a large camber angle has more responsive turning, which is typically beneficial in sports applications. A wheelchair with a little to no camber angle has a smaller overall width and thus greater manoeuvrability in tight confines. Often the wheels can be adjusted so that their camber angle can be changed from 0 degrees to 12 degrees, or sometimes substantially more, where the top of the wheel is closer to the chair than the bottom of the wheel.

Some wheelchairs provide the ability to adjust the fore/aft position of the rear wheel with respect to the wheelchair frame. Such adjustment is known as a "center-of-gravity" adjustment. Shifting the rear wheels rearward produces a more stable wheelchair that is less likely to tip backwards. Shifting the rear wheels forward makes the wheelchair easier to balance on the rear wheels. This helps with manoeuvrability over obstacles, such as curbs, where the wheelchair occupant must lift the front casters off the ground in order to traverse the obstacles.

When an adjustment is made to the rear wheel camber angle the rear height of the wheelchair may also change, which may in turn cause the rear wheels to toe-in or toe-out. That is to say, the rear wheels become misaligned with respect to the frame. This misalignment is undesirable because it increases rolling friction. If the act of decreasing the camber angle raises the rear wheel height, the rear wheels may toe-in. Conversely, increasing the rear wheel camber angle typically lowers the rear wheel height, which may cause the rear wheels to toe-out. To correct toe-in or toe-out, the mounting hardware that attaches the rear wheels to the wheelchair frame must allow the axles of the rear wheel to rotate in order to re-align the camber angle with respect to a vertical sagittal plane. Alternatively, the height of either the rear wheels or the front caster wheels may be changed to adjust the toe-in or toe-out of the drive wheels as well as to keep the main pivot axis of each of the caster wheels vertical.

With some conventional wheelchairs that offer adjustable camber (although note that in many wheelchairs the camber angle is fixed), the camber adjustment takes the user a significant amount of time. Adjusting the camber often requires removing quite a number of parts and adding or subtracting washers or other spacers to achieve the proper angle. Alternatively adjusting the camber may entail needing different camber inserts each with fixed angles. Even when done by a trained technician, the process may still take considerable time.

In some wheelchairs that provide easier means of changing camber angle and center gravity adjustment, often the result is an overly flexible wheelchair frame. A wheelchair that lacks rigidity or is overly flexible typically has reduced performance, may feel cumbersome or un-safe, and may be more prone to breakage.

While many wheelchairs provide wheel camber angle, toe-in, toe-out, and center of gravity adjustability, there is a need for a lightweight, user-friendly adjustment design that minimizes parts, complexity, and adjustment difficulty while at the same time providing adequate rigidity and performance.

SUMMARY

The present disclosure pertains to a wheel mount assembly of the type used with wheelchairs and other devices.

According to a first aspect, there is provided a wheel mount assembly for mounting a drive wheel to a frame of a wheelchair, the assembly comprising a camber body attachable to an axle of one of the drive wheels and operable to pivotably couple about the frame through a range of camber angles; a spacer operable to set a desired camber angle, the spacer contacting the camber body at the desired camber angle; and a clamp operable to secure the camber body and the spacer to the frame at the camber angle. The wheel mount assembly may comprise a clamping member coupled to the frame so as to fix the camber body from pivoting through the camber angles; and a fastener operable to secure the clamping member to the camber body and to the frame. The fastener may be a clamping screw extending through the clamping member and screwed into the camber body. Optionally, the clamping member may be welded to the frame. Additionally, the spacer may be a set screw screwed into the camber body.

Furthermore, the wheel mount assembly may comprise left and right camber bodies, each attachable to one of the drive wheels and each operable to pivotably couple one of the drive wheels about the frame through the range of camber angles; and left and right spacers, each operable to set the desired camber angle, each spacer contacting one of the camber bodies at the desired camber angle; wherein the clamp may comprise a transverse member extendable between the drive wheels and having two ends, each end operable to engage a portion of the frame such that the clamp is prevented from pivoting through the camber angles of each respective camber body; and a pair of fasteners, each fastener operable to secure one of the camber bodies to one of the ends of the transverse member. Each spacer may be a set screw screwed into the camber body. The set screw may abut against the transverse member at the camber angle. The two ends of the transverse member can slidably engage respective longitudinally extending portions of the frame in a longitudinal direction. Furthermore, there may be two metal plugs, each inserted into one of the ends of the transverse member, each metal plug having a radially extending bore therethrough for accepting one of the fasteners. For each drive wheel, an axle receiver insert can be interposed between the axle and the camber body, the axle receiver insertable to different depths in the camber body. The axle receiver insert may comprise an eccentrically located hole for receiving the axle, the hole rotatable within the camber body for adjusting a height of the drive wheel.

According to another aspect of the invention, there is provided a wheelchair comprising a frame; a pair of drive wheels, each having an axle; and a wheel mount assembly for mounting one of drive wheels to the frame, the assembly comprising a camber body attachable to an axle of one of the drive wheels and operable to pivotably couple about the frame through a range of camber angles; a spacer for setting a desired camber angle, the spacer contacting the camber body at the desired camber angle; and a clamp operable to secure the camber body and the spacer to the frame at the camber angle. The clamp may comprise a clamping member coupled to the frame so as to fix the camber body from pivoting through the camber angles; and a fastener operable to secure the clamping member to the camber body and to the frame. The fastener can be a clamping screw extending through the clamping member and screwed into the camber body. Furthermore, the clamping member may be welded to the frame, and the spacer can be a set screw screwed into the camber body.

Furthermore, the wheelchair may comprise left and right camber bodies, each attachable to one of the drive wheels and each operable to pivotably couple one of the drive wheels about the frame through the range of camber angles; and left and right spacers, each operable to set the desired camber angle, each spacer contacting one of the camber bodies at the desired camber angle; wherein the clamp may comprise a transverse member extendable between the drive wheels and having two ends, each end operable to engage a portion of the frame such that the clamp is prevented from pivoting through the camber angles of each respective camber body; and a pair of fasteners, each fastener; being a bolt, is operable to secure one of the camber bodies to one of the ends of the transverse member. The spacer may be a set screw screwed into the camber body. The set screw can abut against the transverse member at the camber angle. The two ends of the transverse member can slidably engage respective longitudinally extending portions of the frame In a longitudinal direction. Furthermore, there may be two metal plugs, each inserted into one of the ends of the transverse member, each metal plug having a radially extending bore therethrough for accepting one of the fasteners. For each drive wheel, an axle receiver insert can be interposed between the axle and the camber body, the axle receiver insertable to different depths in the camber body. The axle receiver insert may comprise an eccentrically located hole for receiving the axle, the hole rotatable within the camber body for adjusting a height of the drive wheel.

The foregoing and other objects, features, and advantages of the invention will become more apparent from the following detailed description, which proceeds with reference to the accompanying figures.

BRIEF DESCRIPTION OF THE DRAWINGS

FIG. 2(*b*) is a front elevation view of the embodiment illustrated in FIGS. 2(*a*) and (*c*).

FIG. 5(*b*) is a front elevation view of the embodiment illustrated in FIGS. 5(*a*) and (*c*).

FIG. 6(*b*) is a front elevation view of the embodiment illustrated in FIGS. 6(*a*) and (*c*).

DETAILED DESCRIPTION

Directional terms such as “left”, “right”, “horizontal”, “vertical”, “transverse” and “longitudinal” are used in this description merely to assist the reader to understand the described embodiments and are not to be construed to limit the orientation of any described method, product, apparatus or parts thereof, in operation with or in connection to another object.

Figure 1:
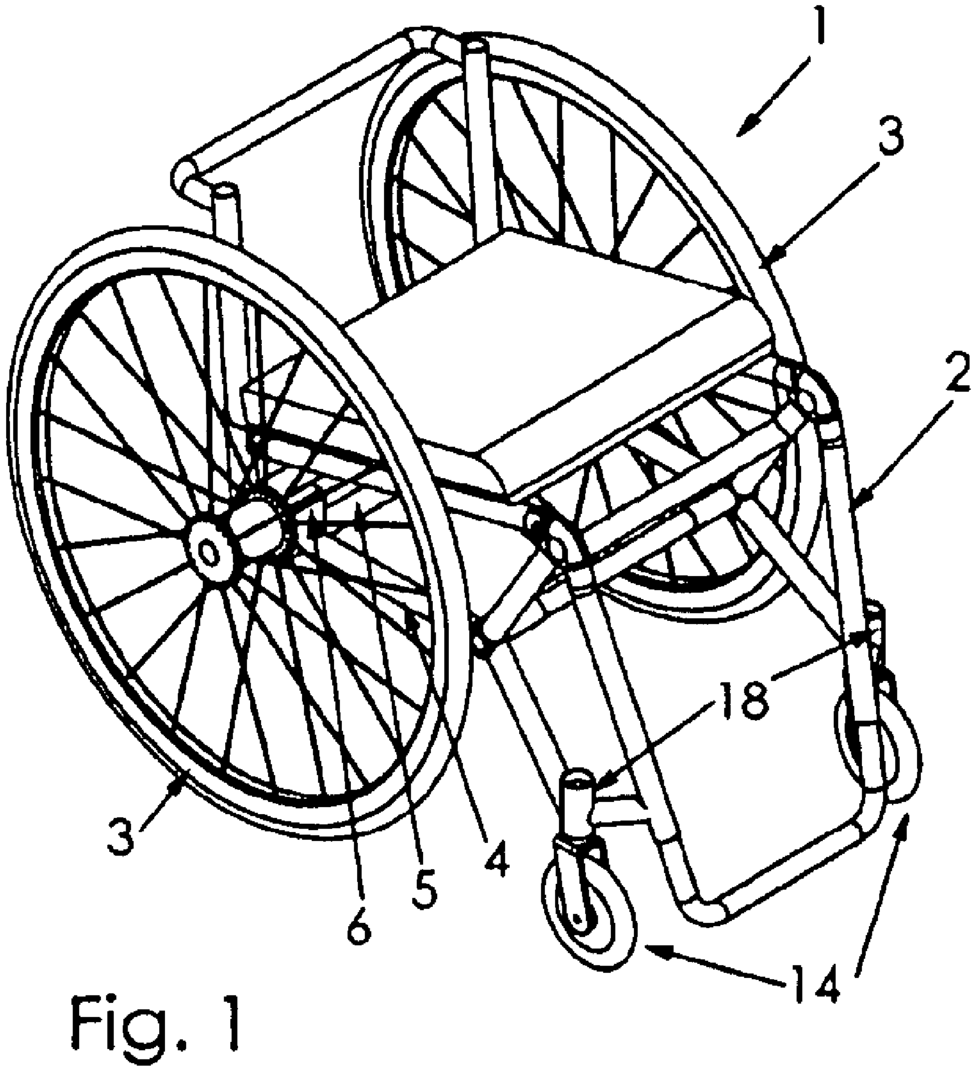
FIG. 1 is a perspective view of a wheelchair.

Referring to FIG. 1, an example wheelchair 1 is depicted having a wheelchair frame 2 with attached rear wheels 3. The rear wheels 3 are attached to the wheelchair frame 2 by axles inserted into camber bodies 6. the camber bodies 6 are coupled to frame members being horizontal tubes 4 which are members of the frame 2 and which extend longitudinally; that is, the tubes 4 extend from the front to the rear of the frame 2. The camber bodies 6 and horizontal tubes 4 are also coupled to a clamping member being a transverse tube 5 that transversely spans across the frame 2. The front of the wheelchair 1 also has caster wheel assemblies 14 attached to the frame 2. The geometry of this example wheelchair 1 is such that the horizontal tubes 4 lie in a horizontal plane, parallel to the ground, and the housing tubes 18 of the caster wheel assemblies 14 lie in a vertical plane, perpendicular to the horizontal plane. In this configuration, a wheel mount assembly can provide an adjustable camber angle of the rear wheels 3, while also maintaining negligible toe-in and toe-out effects of the rear wheels. Such a configuration would provide low rolling resistance and an efficient wheeling mechanism.

Figure 2:
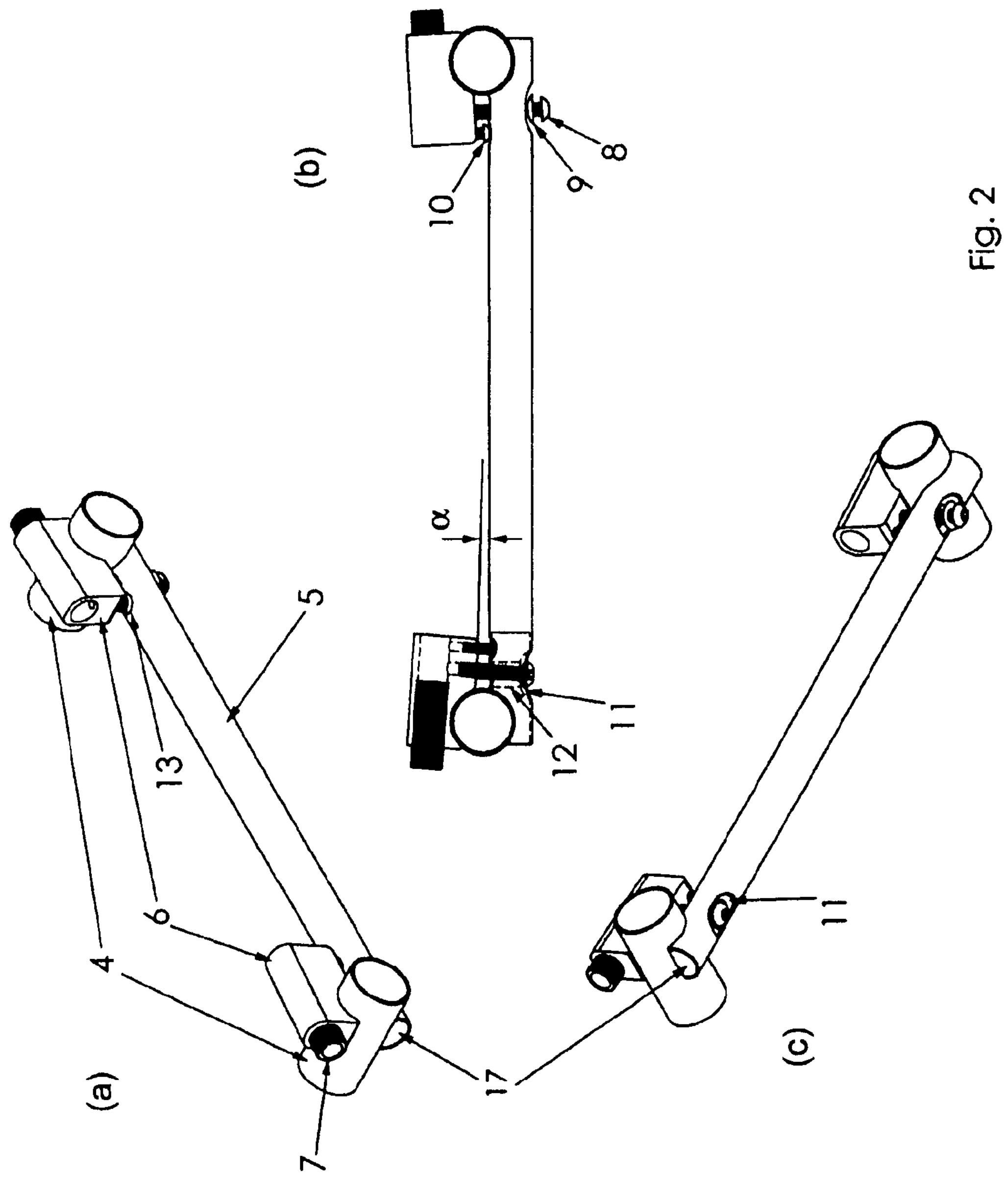
FIGS. 2(*a*) and (*c*) are perspective views of a wheel mount assembly according to one embodiment.

Referring now to FIGS. 2(*a*)-(*c*), which depict three views of the exemplary embodiment of the wheel mount assembly in detail, the transverse tube 5 consists of a tubular structure with alloy plugs 17 inserted into either end to a depth of approximately 2.5 inches. The ends of the transverse tube 5 are shaped to concentrically couple to the horizontal tubes 4 of the wheelchair frame 2. Oval or elongated through-holes 12 are formed in the transverse tube 5 through the tube 5 and alloy plugs 17 such that a fastener being a bolt 8 may pass through the tube 5 at various angles to the vertical. The end of the elongated holes 12 are further shaped to be an elliptical counterbore 11, such as may be obtained through the use of a ball nose end mill. This counterbore 11 is shaped to receive a spherical washer 9 through which the bolt 8 passes such that regardless of the angle of the bolt 8 to the vertical, the bolt may fasten firmly to the transverse tube 5. The counterbore 11 is shaped with a sufficient depth to enable the spherical washers 9 to snugly couple to the transverse tube 5. The bolt 8 can be a socket button head cap screw, for instance, with a head with a flat surface to coincidently mate with the flat side of the spherical washer 9. In an alternative embodiment (not shown), instead of using the counterbore 11 to receive the spherical washer 9, a female spherical washer can be used to receive the spherical washer 9, with the female spherical washer sitting flat on a machined flat shoulder.

The bolt 8 is screwed into the bottom of a camber body 6. The camber bodies 6 are shaped to concentrically couple to the horizontal tubes 4 of the wheelchair frame 2. Another bolt 10 is screwed into the camber body medial to the bolt 8. This bolt 10 is a socket button head cap screw, for instance, which has a head with a radius. The distal surface of the head of the bolt 10 is coincidentally and approximately concentrically coupled to an elliptical counterbore hole 13 shaped in top of the transverse tube 5 and alloy plugs 17. This elliptical hole 13 is sufficiently deep to provide a surface with a radius closely matched to the head of the button head screw 10, again optionally by using a ball nose end mill.

When the bolt 8 is firmly screwed into the camber body 6, the camber body 6 and the transverse tube 5 mate to the horizontal tube 4 on opposing sides of the tube 4, the spherical washer 9 mates to the elongated counterbore 11, and the bolt 10 mates to the elongated counterbore hole 13. Thus the force of the bolt 8 provides sufficient clamping force to rigidly secure the wheel mount assembly to the wheelchair 1.

An axle receiver insert 7 is inserted into the camber body 6. One example of an axle receiver insert 7 is a threaded rod approximately 2 inches long with a bored hole through it to accept a wheel axle. The axle receiver insert 7 can be screwed to various depths into the camber body 6, thus effectively spacing the wheels 3 laterally with respect to the wheelchair frame 2.

The distance that the bolt 10 is screwed into the camber body 6 determines the angle $\alpha$ of the camber body 6 to the horizontal. The more the bolt 10 is screwed into the camber body 6 (the shorter the bolt 10 has an exposed length), the greater the angle $\alpha$ becomes. The angle $\alpha$ determines the angle of the wheels in the following relationship. The angle $\alpha$ between the camber body 6 and a horizontal plane is equal to the camber angle of the wheelchair 1 rear wheels 3 with respect to a vertical sagittal plane. The embodiment depicted in FIGS. 2(*a*)-(*c*) provide for the angle $\alpha$ to be adjusted from 0 degrees to approximately 12 degrees. It is appreciated that the angle $\alpha$ can be made even greater by changing the coupling shapes of the camber bodies 6 and transverse tube 5, as well as the diameters and sizes of the camber bodies 6, the transverse tube 5, and the horizontal tubes 4, and the length of the bolt 10.

Figure 3:
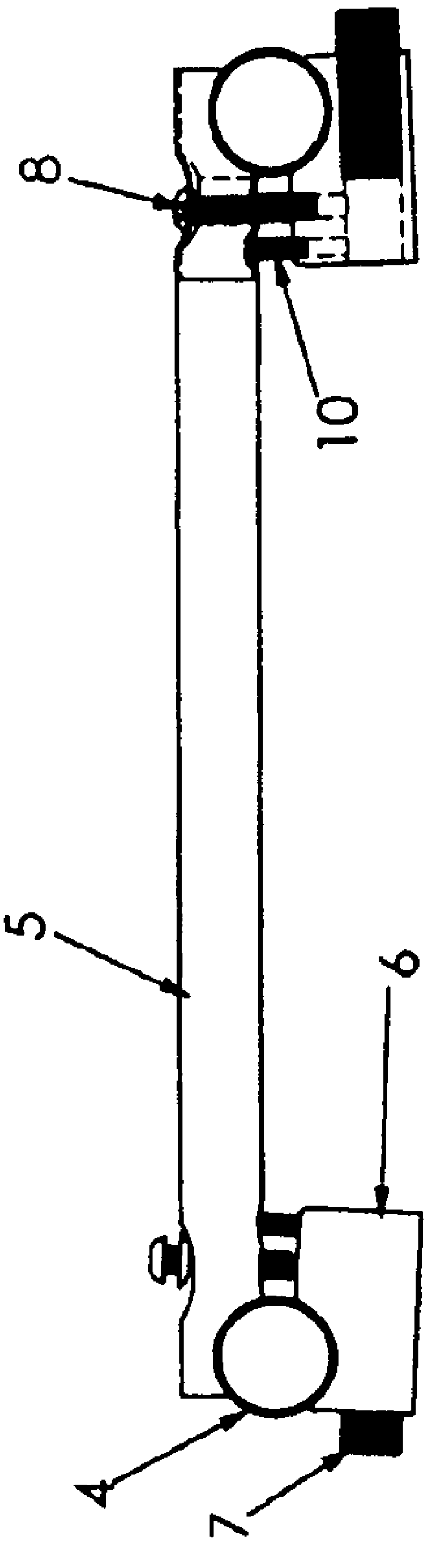
FIG. 3 is a front elevation view a wheel mount assembly according to a second embodiment.

An alternative embodiment is shown in FIG. 3. Essentially, the wheel mount assembly described above and shown in FIGS. 2(*a*)-(*c*) is flipped upside down. To similarly achieve adjustable wheel camber angles, the bolt 10 is screwed into the camber body 6 to various depths. In contrast to the embodiment depicted in FIGS. 2(*a*)-(*c*), a longer exposed length of the bolt 10 equates to a greater wheel camber angle. One benefit of the embodiment illustrated in FIG. 3 is that the head of the bolts 8, 10 face upwards, which can make their adjustment easier than that of the bolts 8, 10 of the embodiment illustrated in FIGS. 2(*a*)-(*c*).

In both embodiments described above, and referring to the example wheelchair 1 in FIG. 1, it is appreciated that changing the camber angle $\alpha$ of the rear wheels 3 would also change the relative height of the rear of the wheelchair frame 2. Such a change may tilt the plane in which the horizontal tubes 4 lie such that it is no longer parallel with the horizontal plane, and may also tilt the plane in which the housing tubes 18 of the caster wheel assemblies 14 lie such that it is no longer parallel with the vertical plane. Such changes may increase the toe-in or toe-out of the rear wheels 3 and impact rolling resistance and pushing efficiency. This could be mitigated in the example wheelchair 1 by changing the relative height of the housing tubes 18 of the caster wheel assemblies 14 for a given wheel camber angle in order to adjust the tilt of the planes in which the horizontal tubes 4 and vertical housing tubes 18 of the caster wheel assemblies 14 lie. The relative height of the housing tubes 18 may be changed with washers or spacers. Given the embodiments of the wheel mount assemblies described above, the toe-in and toe-out would then be negligible.

Figure 4:
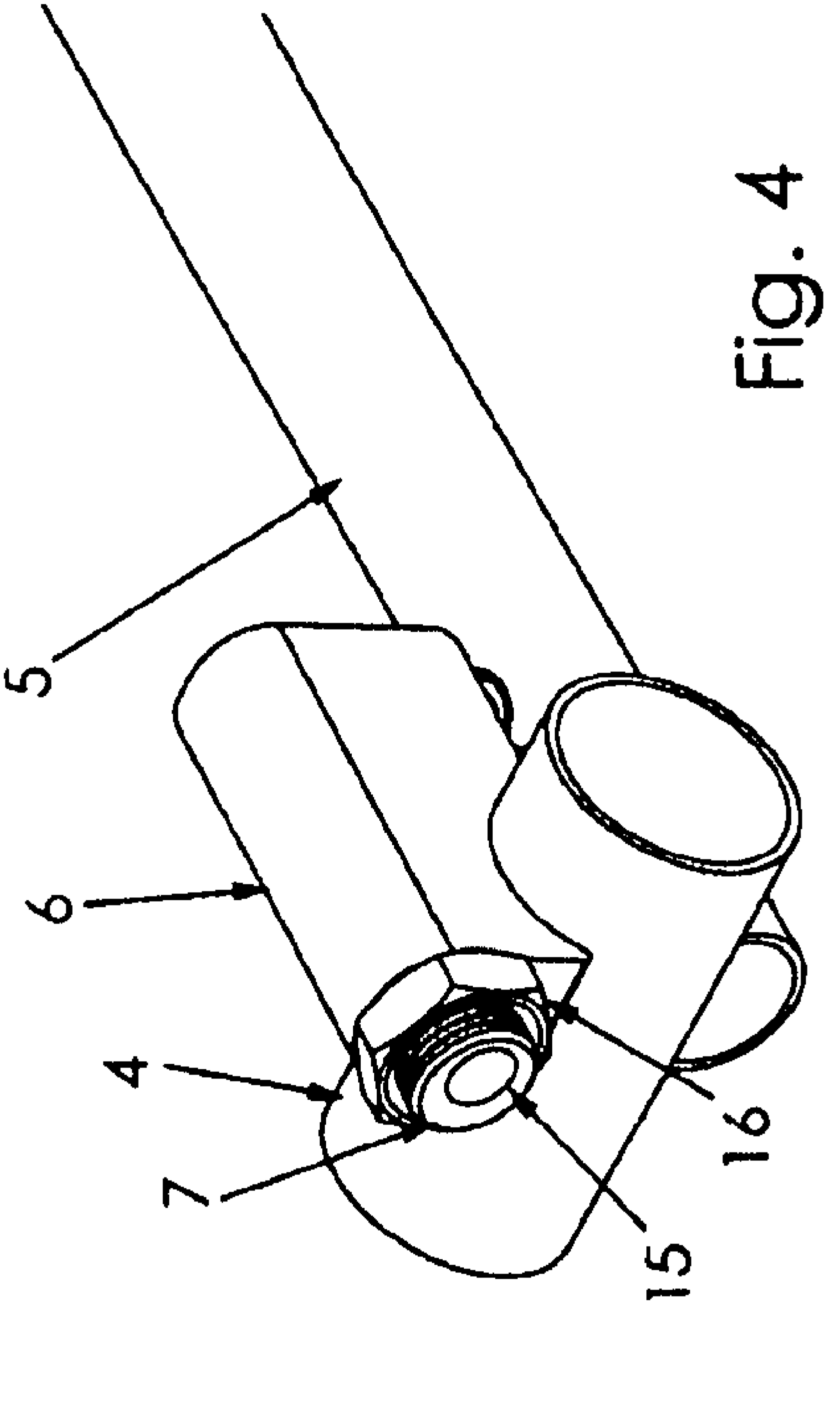
FIG. 4 is a perspective view of a wheel mount assembly depicting an eccentric axle receiver insert according to a third embodiment.

Referring to FIG. 4, an axle receiver insert 7 with an eccentrically placed hole 15 is shown. This alternative embodiment may be needed if by changing the camber angle of the wheels 3, the rear height of the wheelchair 1 is raised or lowered, and that this changed height could not be compensated for by changing the height of the caster wheel housings 18. Such a change in rear height may alter the toe-in toe-out of the rear wheels 3, thus impacting rolling resistance and pushing efficiency. To alter the toe-in and toe-out to a negligible amount, the axle receiver insert 7 with an eccentric hole 15 can be rotated in the camber body 6. The eccentric hole 15 would then provide a means to subtly alter the toe-in and toe-out of the rear wheels 3. Once the optimum rotational placement of the axle receiver insert 7 with an eccentric hole 15 is achieved, the position can be fixed in place by tightening the jam nut 16 firmly against the camber body 6.

Figure 5:
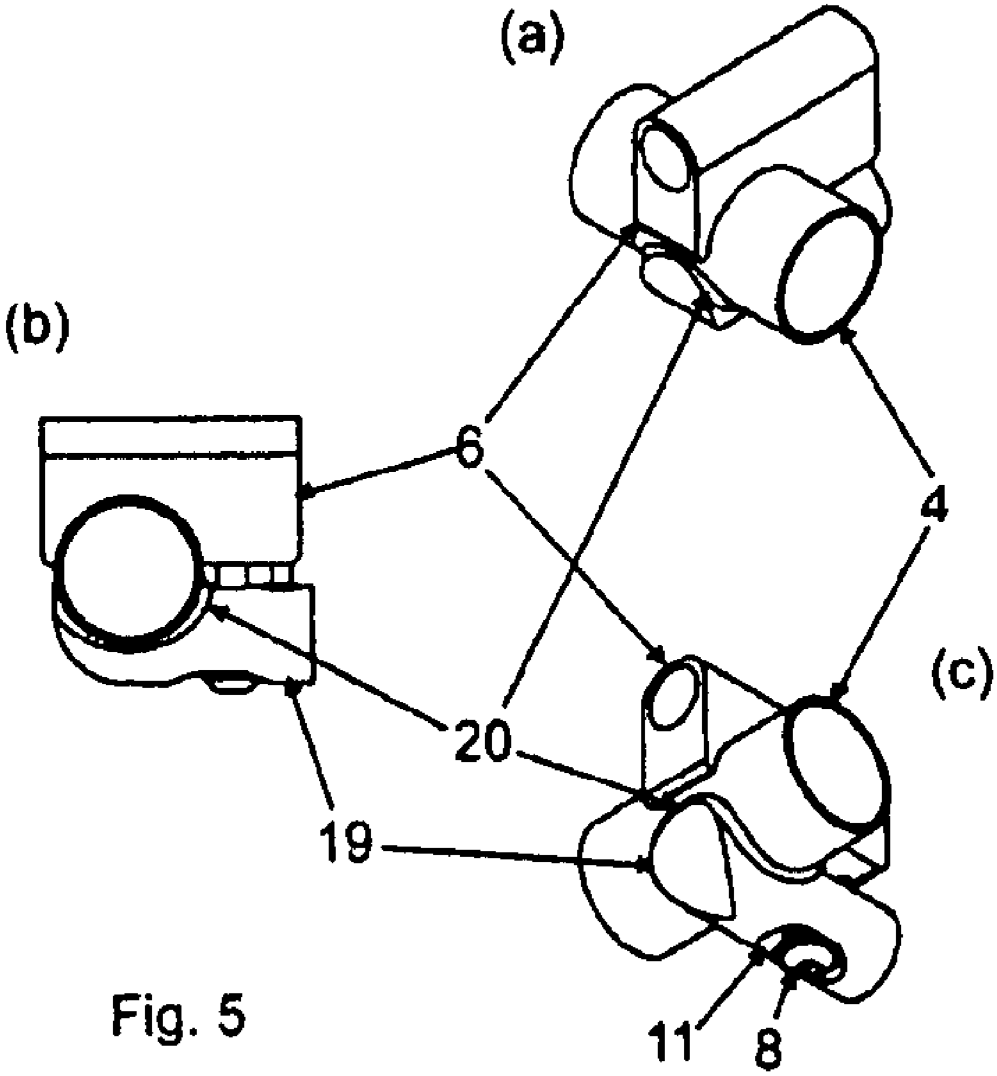
FIGS. 5(*a*) and (*c*) are perspective views of a wheel mount assembly according to a fourth embodiment.
Figure 6:
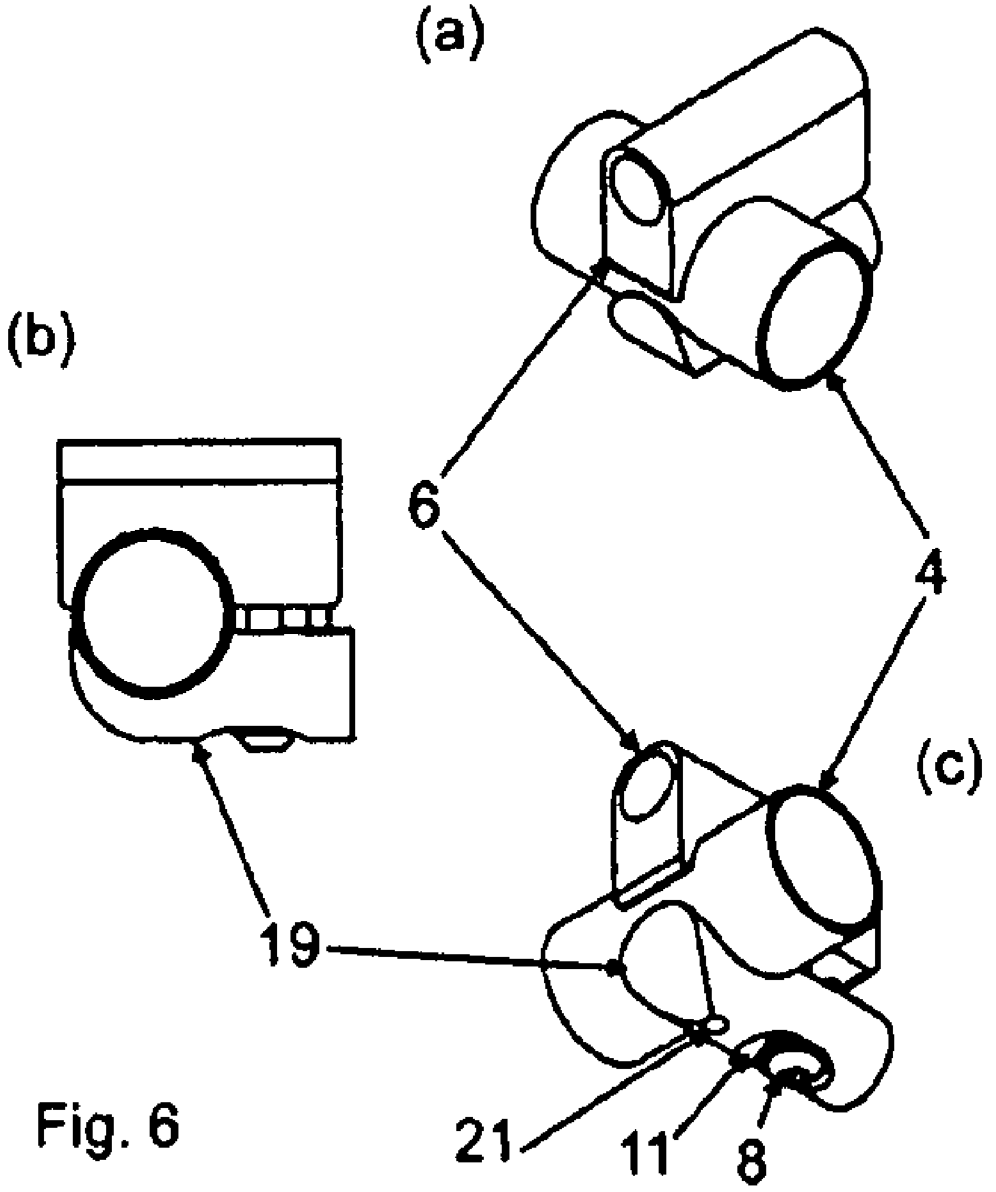
FIGS. 6(*a*) and (*c*) are perspective views of a wheel mount assembly according to a fifth embodiment.

Referring now to FIGS. 5(*a*)-(*c*) and 6(*a*)-(*c*), embodiments of the present invention wherein the transverse tube 5 is absent are depicted. In FIGS. 5(*a*)-(*c*) and 6(*a*)-(*c*), in lieu of the transverse tube 5, a clamping member being a lower camber body 19 is present. The bolt 10 abuts against the lower camber body 19 instead of the transverse tube 5 when the camber body 6 is at the desired camber angle a. Referring specifically to FIGS. 5(*a*)-(*c*), the lower camber body 19 is welded to the horizontal tube 4, as evidenced by the presence of a weld bead 20. Referring specifically to FIGS. 6(*a*)-(*c*), the lower camber body 19 is secured to the horizontal tube 4 with a pin 19, which extends through the lower camber body 19, the horizontal tube 4, and the camber body 6. The combination of the pin 19 and the clamping force resulting from the bolt 8 result to prevent movement of the camber bodies 6, 19 about the tube 4. While the camber bodies 6, 19 depicted in FIGS. 5(*a*)-(*c*) are necessarily fixed to the horizontal tube 4 at the location of the weld bead 20, the camber bodies 6, 19 depicted in FIGS. 6(*a*)-(*c*) are movable to different positions along the horizontal tube 4 so long as at each position to which the camber bodies 6, 19 are to be moved, a channel for receiving the pin 19 exists within the tube 4.

All embodiments described above, and others not shown here, also provide another feature: the wheel mount assembly can be slid rearwards and forwards along the horizontal tubes 4 and clamped in position. By changing the clamping position along the horizontal tubes 4, the center of gravity of the wheelchair 1 can be changed.

The components of the wheel mount assembly can be manufactured from a light alloy material to reduce the weight of the wheelchair 1. Suitable such materials include steel alloys, aluminum alloys, titanium alloys, magnesium alloys, plastics such as polycarbonate, carbon fibre composites, and other materials suitable for such an application. By selecting such materials and by utilizing the design of the wheel mount assembly described here, it is expected that the weight of the wheelchair 1 can minimized.

The embodiments described herein can offer several advantages. For instance, the lateral distance between the rear wheels 3 may be adjusted by varying the insertion depth of the axle receiver insert 7 within the camber body 6. In the embodiments of the invention wherein the camber bodies may be coupled at different positions along the horizontal tubes 4, the center of gravity of the wheelchair may be adjusted. The camber angle of the wheels 3 may be adjusted by removing bolts 8 and un-clamping the wheel mount assemblies. The depths of the bolts 10 can then be adjusted and the wheel mount assemblies re-clamped. The toe-in and toe-out of the wheels 3 may be adjusted by changing the heights of the caster wheel housings 18 or by rotating the axle receiver inserts 7 with eccentrically placed holes 15.

While the present invention has been described herein by the preferred embodiments, it will be understood to those skilled in the art that various changes may be made and added to the invention. The changes and alternatives are considered within the spirit and scope of the present invention.

I claim:

1. A wheel mount assembly for mounting a drive wheel to a frame member of a wheelchair frame, the wheel mount assembly comprising:

a clamp assembly comprising left and right fasteners and a clamping member arranged to be coupled to the wheelchair frame at a fixed angle about the frame member;

left and right camber bodies, each camber body attachable to an axle of a respective one of the drive wheels and each operable to pivotably couple said one of the drive wheels about a respective frame member of the wheelchair frame through a range of camber angles; and left and right spacers, each spacer operable to be clamped between the clamping member and a respective one of the camber bodies so as to set a desired camber angle of the camber body;

each spacer comprising a set screw which is screwed into one of the respective camber body or the clamp member such that the spacer is adjustable relative to the camber body between a plurality of different positions wherein each of the different positions is a different distance that the set screw is screwed into said one of the respective camber body or the clamp member which corresponds to a different camber angle;

the clamp member of said clamp assembly comprising a transverse member extendable between the drive wheels and having two ends, each end operable to engage a portion of the wheelchair frame such that the clamp member is prevented from pivoting through the camber angles of each respective camber body;

the left and right fasteners of said clamp assembly being operable to secure respective ones of the camber bodies relative to the clamping member such that the respective spacers are each clamped between the respective camber body and the clamping member at a selected one of the different positions of the spacer and the respective camber body is fixed at a corresponding one of the different camber angles.

2. A wheel mount assembly as claimed in claim 1 wherein the clamping member is welded to the wheelchair frame.

3. A wheel mount assembly as claimed in claim 1 wherein the set screw abuts against the transverse member at the camber angle.

4. A wheel mount assembly as claimed in claim 3 wherein the two ends of the transverse member slidably engage respective longitudinally extending frame members of the wheelchair frame in a longitudinal direction.

5. A wheel mount assembly as claimed in claim 4 further comprising two metal plugs, each inserted into one of the ends of the transverse member, each metal plug having a radially extending bore therethrough for accepting one of the fasteners.

6. A wheel mount assembly as claimed in claim 5 wherein for each drive wheel an axle receiver insert is interposed between the axle and the camber body, the axle receiver being insertable to different depths in the camber body.

7. A wheel mount assembly as claimed in claim 6 wherein the axle receiver insert comprises an eccentrically located hole for receiving the axle, the hole rotatable within the camber body for adjusting a height of the drive wheel.

8. The wheel mount assembly according to claim 1 wherein the fastener is operable to secure the camber body relative to the clamping member such that the frame member of the wheelchair frame is clamped between the camber body and the clamping member at each of the different positions of the spacer.

9. A wheelchair comprising:

a wheelchair frame including a plurality of frame members;

a pair of drive wheels, each having an axle; and a wheel mount assembly for mounting one of the drive wheels to a respective one of the frame members, the wheel mount assembly comprising:

a clamp assembly comprising left and right fasteners and a clamping member arranged to be coupled to the wheelchair frame at a fixed angle about the frame member;

left and right camber bodies, each camber body attachable to the axle of a respective one of the drive wheels and each operable to pivotably couple said one of the drive wheels about a respective frame member of the wheelchair frame through a range of camber angles; and left and right spacers, each spacer operable to be clamped between the clamping member and a respective one of the camber bodies so as to set a desired camber angle of the camber body;

each spacer comprising a set screw which is adjustable relative to the camber body between a plurality of different positions wherein each of the different positions is a different exposed length of the set screw which corresponds to a different camber angle;

the clamp member of said clamp assembly comprising a transverse member extendable between the drive wheels and having two ends, each end operable to engage a portion of the wheelchair frame such that the clamp member is prevented from pivoting through the camber angles of each respective camber body;

the left and right fasteners of said clamp assembly being operable to secure respective ones of the camber bodies relative to the clamping member such that the respective spacers are each clamped between the respective camber body and the clamping member at a selected one of the different positions of the spacer and the respective camber body is fixed at a corresponding one of the different camber angles.

10. A wheelchair as claimed in claim 9 wherein the clamping member is welded to the wheelchair frame.

11. A wheelchair as claimed in claim 9 wherein the set screw abuts against the transverse member at the camber angle.

12. A wheelchair as claimed in claim 11 wherein the two ends of the transverse member slidably engage respective longitudinally extending frame members of the wheelchair frame in a longitudinal direction.

13. A wheelchair as claimed in claim 12 further comprising two metal plugs, each inserted into one of the ends of the transverse member, each metal plug having a radially extending bore therethrough for accepting one of the fasteners.

14. A wheelchair as claimed in claim 13 wherein for each drive wheel an axle receiver insert is interposed between the axle and the camber body, the axle receiver insertable to different depths in the camber body.

15. A wheelchair as claimed in claim 14 wherein the axle receiver insert comprises an eccentrically located hole for receiving the axle, the hole being rotatable within the camber body for adjusting a height of the drive wheel.

16. The wheelchair according to claim 9 wherein the fastener is operable to secure the camber body relative to the clamping member such that the respective frame member of the wheelchair frame is clamped between the camber body and the clamping member at each of the different positions of the spacer.

* * * * *